(12) United States Patent
Tsuei

(10) Patent No.: US 8,509,851 B2
(45) Date of Patent: Aug. 13, 2013

(54) METHOD FOR DISPLAYING SPEED DIAL INFORMATION AND DEVICE USING THE METHOD

(75) Inventor: Yuan-Mao Tsuei, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 897 days.

(21) Appl. No.: 12/254,443

(22) Filed: Oct. 20, 2008

(65) Prior Publication Data
US 2009/0124239 A1 May 14, 2009

(30) Foreign Application Priority Data
Nov. 8, 2007 (TW) ................................. 96142214 A

(51) Int. Cl.
*H04M 1/00* (2006.01)
*H04W 4/00* (2009.01)

(52) U.S. Cl.
USPC .......................................... 455/564; 455/457

(58) Field of Classification Search
USPC .............. 455/564, 566, 575.1, 401, 460, 565, 455/415; 345/168–179, 173; 340/7.55
See application file for complete search history.

(56) References Cited

U.S. PATENT DOCUMENTS

| | | | | |
|---|---|---|---|---|
| 5,901,365 | A | * | 5/1999 | Yasuda et al. .................. 455/564 |
| 6,021,193 | A | * | 2/2000 | Thomas .................... 379/387.01 |
| 7,031,756 | B1 | * | 4/2006 | Sim et al. ....................... 455/566 |
| 7,738,912 | B1 | * | 6/2010 | Hawkins et al. ............ 455/550.1 |
| 7,746,325 | B2 | * | 6/2010 | Roberts .......................... 345/173 |
| 2002/0198027 | A1 | * | 12/2002 | Rydbeck ........................ 455/564 |
| 2008/0107253 | A1 | * | 5/2008 | Gupta ....................... 379/216.01 |

FOREIGN PATENT DOCUMENTS

| | | | |
|---|---|---|---|
| CN | 1199424 A | | 11/1998 |
| CN | 1510553 A | | 7/2004 |
| GB | 2278756 A | * | 12/1994 |
| TW | 200736976 | | 10/2007 |

* cited by examiner

*Primary Examiner* — Charles Appiah
*Assistant Examiner* — Emem Stephen
(74) *Attorney, Agent, or Firm* — Birch, Stewart, Kolasch & Birch, LLP

(57) ABSTRACT

A method for displaying speed dial information is disclosed. A dialing signal is defined and stored in a memory of a mobile communication device. When the mobile communication device receives a trigger signal generated by pressing a button, it is determined whether the dialing signal is received. Contact information corresponding to the pressed button is displayed on a screen of the mobile communication device if the dialing signal is not received.

9 Claims, 3 Drawing Sheets

METHOD FOR DISPLAYING SPEED DIAL INFORMATION AND DEVICE USING THE METHOD

CROSS REFERENCE TO RELATED APPLICATIONS

This Application claims priority of Taiwan Patent Application No. 96142214, filed on Nov. 8, 2007, the entirety of which is incorporated by reference herein.

DESCRIPTION OF THE RELATED ART

"Speed Dial" (or Abbreviated Dial) enables users to store frequently used phone number on each button of a keypad of a mobile communication device. Usually, the user may store totally ten phone numbers for buttons 0 to 10 of the keypad. When the phone numbers have been stored for a button, the user may press the button (a speed dial button) for a period of time to dial the phone number assigned to the pressed button, allowing for time savings and convenience.

However, when a speed dial number was just assigned to a button lately or if some speed dial buttons are not frequently used, users may probably forget which phone numbers are assigned to which speed dial buttons. Thus, the disclosure provides a speed dialing method for displaying contact information.

BRIEF SUMMARY

The disclosure provides methods for displaying speed dial settings. An exemplary embodiment of a method for displaying speed dial information comprises the following steps. A dialing signal is defined and stored in a memory of a mobile communication device. When the mobile communication device receives a trigger signal generated by pressing a button, it is determined whether the dialing signal is received. Contact information corresponding to the pressed button is displayed on a screen of the mobile communication device if the dialing signal is not received.

The disclosure further provides mobile communication devices. An exemplary embodiment of a mobile communication device comprises a screen, a dialing module, a memory, a signal receiving module, and a microcontroller. The dialing module comprises a keypad providing plural buttons. The memory stores a dialing signal. The signal receiving module receives a trigger signal generated by pressing one of the buttons of the keypad. The microcontroller receives the trigger signal and determines whether the dialing signal is received, and then displays contact information corresponding to the pressed button on a screen of the mobile communication device if the dialing signal is received.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
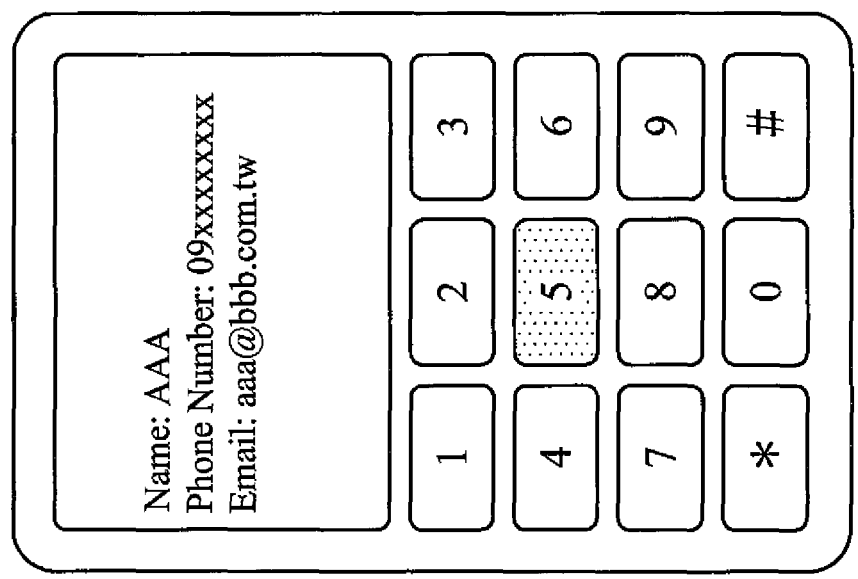
FIG. 1 is a schematic view of displaying speed dial information of the present invention.

Several exemplary embodiments of the disclosure are described with reference to FIGS. 1 through 3, which generally relate to speed dialing for a mobile phone. It is to be understood that the following disclosure provides various different embodiments as examples for implementing different features of the disclosure. Specific examples of components and arrangements are described in the following to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The disclosure discloses a method for displaying speed dial information and a mobile communication device using the method.

In an embodiment of a method for displaying speed dial information, when a button of a mobile communication device (such as a cellular phone, a personal digital assistant (PDA) phone, a smart phone, and so forth) is pressed, contact information (such as a name, a phone number, a picture, an email, and so forth) corresponding to the pressed button is displayed on a screen of the mobile communication device.

In an embodiment, when a button "5" is pressed, for example, if a force value for pressing the button "5" does not reach a force threshold value (50 milligram (mg), for example), a trigger signal is generated and contact information assigned to the pressed button "5" is displayed on the screen, as shown in FIG. 1. In another embodiment, the trigger signal is generated if the force value for pressing the button "5" does not reach a force threshold value (50 milligram (mg), for example) and a time for continuously pressing the pressed button "5" does not reach a first time threshold value (1,000 millisecond (ms), for example). When the force value for the pressed button "5" at least reaches the force threshold value (50 mg, for example), a dialing signal is generated and the mobile communication device dials a phone number assigned to the pressed button "5" for communicating with a desired contact of the phone number.

In an embodiment, after the dialing signal is generated, a second time threshold value (1,000 ms, for example) is further defined. If the time for continuously receiving the dialing signal reaches the second time threshold value, the mobile communication device dials a contact phone number assigned to the pressed button "5." If the time for continuously pressing the pressed button does not reach the second time threshold value, the mobile communication device inputs and displays the number "5" on the pressed button.

Each of the buttons installed on the mobile communication device may be a screen button (soft button, virtual button) or a physical button (hardware button). In an embodiment, the button is a screen button, it may be implemented by, for example, but not limited to, a resistance touch panel (screen), a capacitive touch panel (screen) with a metal dome, other suitable touch panel (screen), or other suitable touch panel (screen) with a metal dome. In another embodiment, the button is a physical button, it may be implemented by, for example, but not limited to, a capacitive touch panel with a metal dome or other suitable touch panel with a metal dome.

In an embodiment wherein the button is implemented by a capacitive touch panel with a metal dome, a trigger signal is generated when a button on the capacitive touch panel is pressed; and a dialing signal is generated when the button with the metal dome is pressed.

The above described implementation is not to be limitative, any physical or screen buttons implemented by other manners for generating trigger and dialing signals can also used for implementation.

Figure 2:
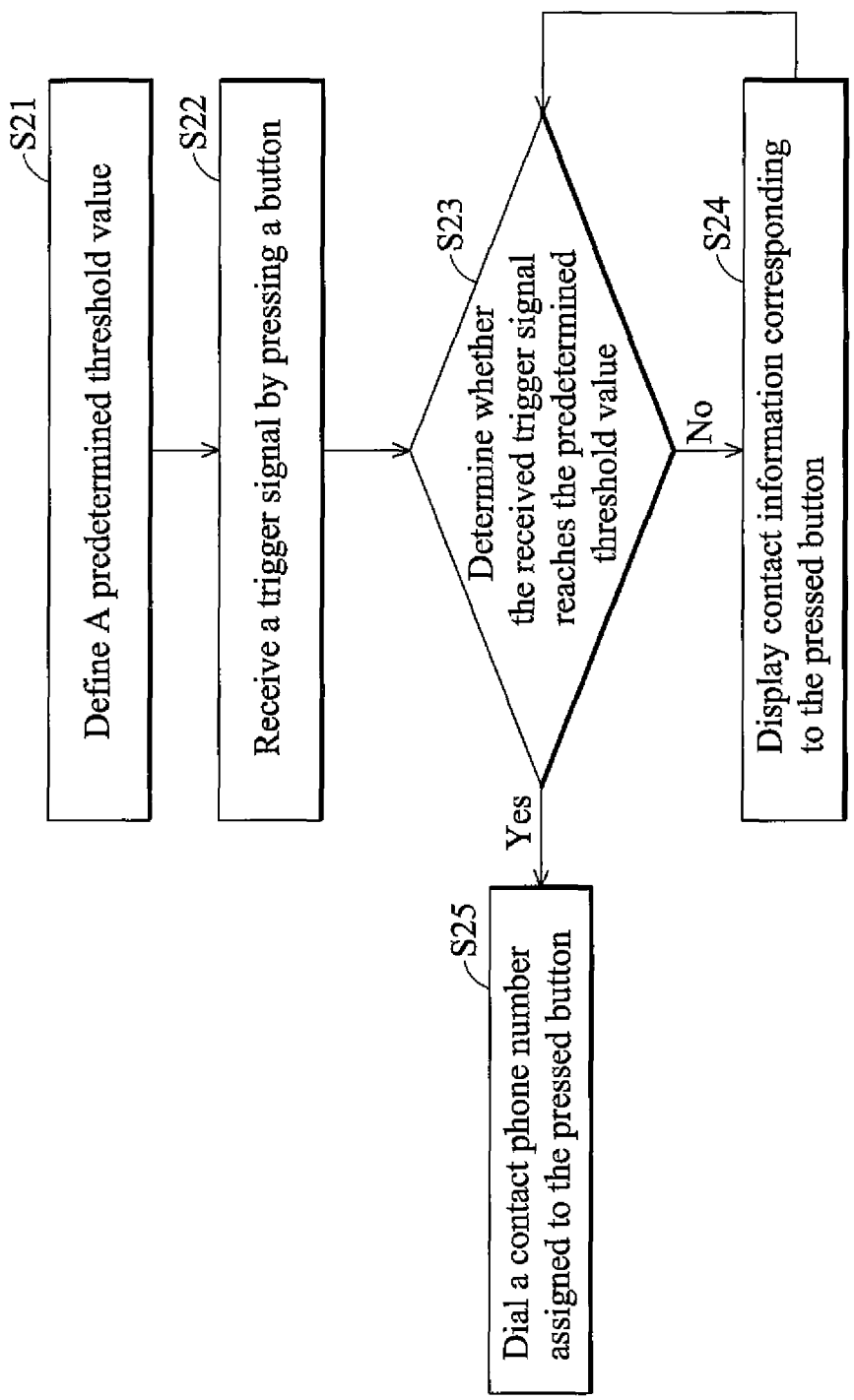
FIG. 2 is a flowchart of a method for displaying speed dial information of the present invention.

FIG. 2 is a flowchart of a method for displaying speed dial information of the present invention.

A dialing signal for a touch panel of a mobile communication device is defined and stored in a memory of the mobile communication device (step S21). The mobile communication device receives a trigger signal generated by pressing a button thereof (step S22) and determines whether a dialing signal is received (step S23). If the dialing signal is not received, contact information corresponding to the pressed button is displayed on a screen of the mobile communication device (step S24).

In an embodiment, the dialing signal represents a force threshold value, when a force value for pressing the pressed button does not reach the force threshold value, the trigger signal is generated and the contact information corresponding to the pressed button is displayed on the screen of the mobile communication device, as shown in FIG. 1. In another embodiment, the trigger signal is generated if the force value for pressing the button does not reach a force threshold value and a time for continuously pressing the pressed button does not reach a first time threshold value.

If the dialing signal is received, the mobile communication device dials the phone number assigned to the pressed button (step S25). In an embodiment, after the dialing signal is generated, a second time threshold value (1000 ms, for example) is further defined. If the time for continuously pressing the pressed button reaches the second time threshold value, the mobile communication device dials the phone number assigned to the pressed button. In an embodiment, the button is a number button, and if the time for continuously pressing the pressed button does not reach the second time threshold value, the mobile communication device inputs and displays a number on the pressed button.

Figure 3:
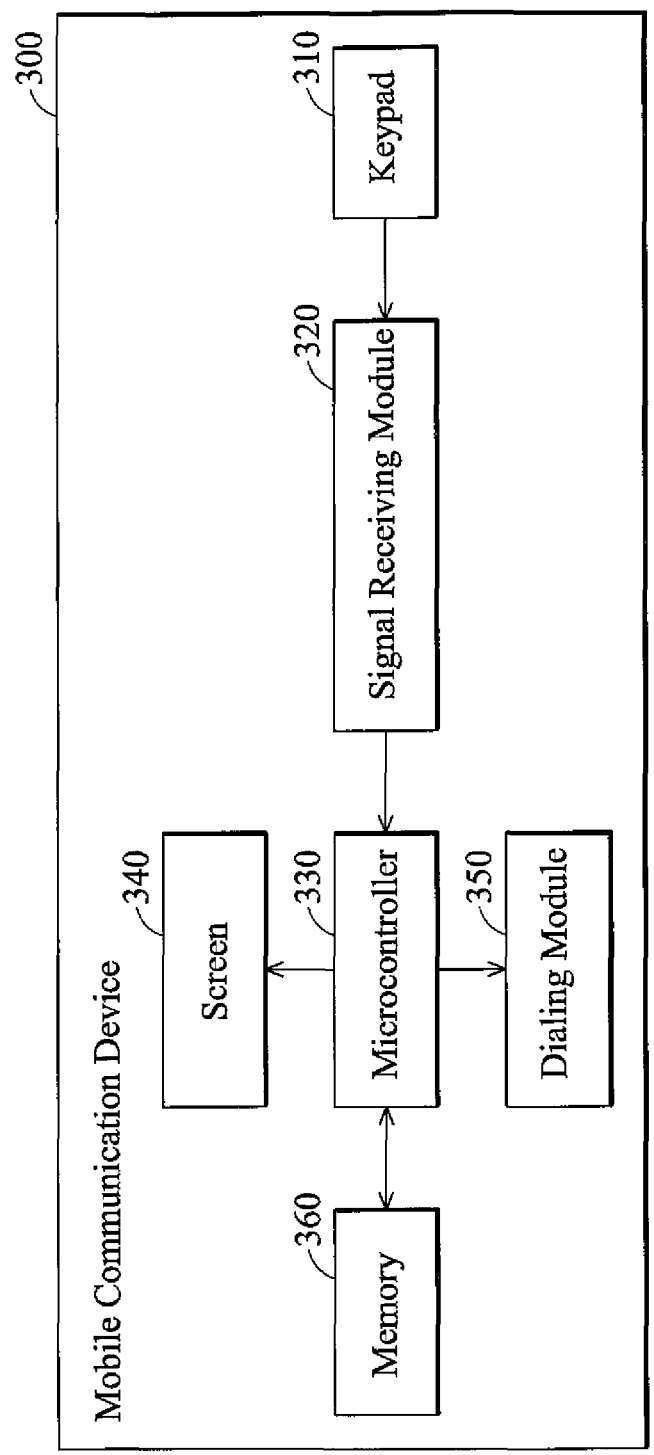
FIG. 3 is a schematic view of a mobile communication device of the present invention.

FIG. 3 is a schematic view of a mobile communication device of the present invention.

Mobile communication device 300 comprises a signal receiving module 320, a microcontroller 330, a screen 340, a dialing module 350 comprising a keypad 310, and a memory 360.

Memory 330 stores a dialing signal defined for dialing module 350 of mobile communication device 300.

Microcontroller 330 receives a trigger signal generated by pressing a button of keypad 310 via signal receiving module 320 and determines whether a dialing signal is received. If the dialing signal is not received, microcontroller 330 displays contact information corresponding to the pressed button on screen 330.

If the dialing signal is received, microcontroller 330 dials a phone number assigned to the pressed button via dialing module 350 for communicating with a desired contact of the phone number.

In an embodiment, when a button is pressed, if a force value for pressing the button does not reach a force threshold value, the trigger signal is generated and the contact information assigned to the pressed button is displayed on the screen. In another embodiment, the trigger signal is generated if the force value for pressing the button does not reach a force threshold value and a time for continuously pressing the pressed button does not reach a first time threshold value. When the force value for the pressed button at least reaches the force threshold value, a dialing signal is generated and the mobile communication device dials the phone number assigned to the pressed button for communicating with a desired contact of the phone number.

In an embodiment, after the dialing signal is generated, a second time threshold value is further defined. If the time for continuously pressing the pressed button reaches the second time threshold value, the mobile communication device dials the phone number assigned to the pressed button. In an embodiment, the button is a number button, and if the time for continuously pressing the pressed button does not reach the second time threshold value, the mobile communication device inputs and displays a number on the pressed button.

In the above embodiments, the keypad 310 may be a screen keypad (soft keypad) or a physical keypad (hardware keypad), and the button may be a screen button (soft button) or a physical button (hardware button).

In an embodiment, the keypad is a screen keypad implemented by a touch screen, for example a resistance touch screen. When a screen button is pressed, if a force value for pressing the button does not reach a force threshold value, the trigger signal is generated and the contact information assigned to the pressed button is displayed on the screen; and if the force value for the pressed button at least reaches the force threshold value, a dialing signal is generated.

In another embodiment, the keypad is a screen keypad implemented by a touch screen, for example a capacitive touch screen, with a metal dome under the touch screen. When a screen button is touched, the trigger signal is generated and the contact information assigned to the pressed button is displayed on the screen; and when the metal dome is pressed, a dialing signal is generated.

In still another embodiment, the keypad is a physical keypad implemented by a touch panel, for example a capacitive touch panel, with a metal dome under the touch panel. When a physical button is touched, the trigger signal is generated and the contact information assigned to the pressed button is displayed on the screen; and when the metal dome is pressed, a dialing signal is generated.

Methods and devices of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the disclosure has been described by way of example and in terms of the embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for displaying speed dial information, comprising: defining and storing a dialing signal in a memory of a mobile communication device;

when the mobile communication device receives an operation representing a surface of a physical button is touched, generating a trigger signal and displaying contact information corresponding to the physical button on a screen of the mobile communication device in response to the trigger signal;

when the mobile communication device further receives an operation representing the physical button is pressed, generating a dialing signal; defining a first time threshold value; and dialing a phone number assigned to the pressed physical button by the mobile communication device if a time for receiving the dialing signal reaches the first time threshold value;

wherein the physical button is a number button, and if the time for receiving the dialing signal does not reach the first time threshold value, a number on the pressed number button is inputted by the mobile communication device, wherein the physical button is a screen button comprising a touch screen and a metal dome under the touch panel, and the method further comprising:

generating the trigger signal when the touch screen is touched; and generating the dialing signal when the metal dome is pressed.

2. The method for displaying speed dial information as claimed in claim 1, further comprising: defining a force threshold value; and generating the dialing signal if a force value for pressing the pressed physical button reaches the force threshold value.

3. The method for displaying speed dial information as claimed in claim 1, wherein the physical button comprises a touch panel thereon, and the method further comprising: generating the trigger signal when the touch panel is touched.

4. A mobile communication device, comprising: a screen; a dialing module, comprising a physical keypad providing a plurality of physical buttons; a memory, storing a dialing signal defined for the dialing module;

a signal receiving module, receiving a trigger signal and a pressed signal generated by touching and pressing one of the physical buttons of the physical keypad, respectively; and a microcontroller, receiving the trigger signal and the pressed signal via the signal receiving module wherein the microcontroller displays contact information corresponding to the physical button on the screen when the trigger signal is received, and the microcontroller performs the dialing signal when the pressed signal is received, wherein the memory stores a first time threshold value, and a contact phone number assigned to the pressed physical button is dialed by the dialing module if a time for receiving the dialing signal reaches the first time threshold value, wherein the physical button is a number button, and a number on the pressed number button is inputted by the dialing module if the time for receiving the dialing signal does not reach the first time threshold value, wherein the physical button is a screen button, comprising a touch screen and a metal dome under the touch panel, the trigger signal generated when the touch screen is touched, and the dialing signal generated when the metal dome is pressed.

5. The mobile communication device as claimed in claim 4, wherein the memory stores a force threshold value and the dialing signal is generated if a force value from pressing the pressed physical button reaches the force threshold value.

6. The mobile communication device as claimed in claim 4, wherein the physical button comprises a touch panel thereon, the trigger signal generated when the touch panel is touched.

7. A non-transitory computer readable medium containing instructions for performing the method of claim 1.

8. The method for displaying speed dial information as claimed in claim 1, further comprising: defining a second time threshold value; and generating the trigger signal if a time for continuously touching the physical button received by the mobile communication device reaches the second time threshold value.

9. The mobile communication device as claimed in claim 4, wherein the memory stores a second time threshold value, and the trigger signal is generated if a time for continuously pressing the physical button received by the signal receiving module reaches the second time threshold value.

* * * * *